(12) United States Patent
Luo et al.

(10) Patent No.: US 11,016,645 B2
(45) Date of Patent: May 25, 2021

(54) WINDOW SPLIT SCREEN DISPLAY METHOD, DEVICE AND EQUIPMENT

(71) Applicant: Beijing Bytedance Network Technology Co., Ltd., Beijing (CN)

(72) Inventors: Yonghao Luo, Beijing (CN); Zhiyong Chen, Beijing (CN); Yangmao Wang, Beijing (CN); Xijie Hao, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/019,782

(22) Filed: Sep. 14, 2020

(65) Prior Publication Data
US 2020/0409541 A1    Dec. 31, 2020

Related U.S. Application Data

(63) Continuation of application No. PCT/CN2019/081083, filed on Apr. 2, 2019.

(30) Foreign Application Priority Data

Apr. 2, 2018    (CN) .......................... 201810283284.8

(51) Int. Cl.
*G06F 3/0488*    (2013.01)
*G06F 3/0484*    (2013.01)
(Continued)

(52) U.S. Cl.
CPC ........ *G06F 3/04845* (2013.01); *G06F 3/0481* (2013.01); *G06F 3/04886* (2013.01); *G09G 5/14* (2013.01); *G06F 2203/04803* (2013.01)

(58) Field of Classification Search
None
See application file for complete search history.

(56) References Cited

U.S. PATENT DOCUMENTS

| 2010/0313110 A1 | 12/2010 | Claridge et al. |
| 2011/0102464 A1* | 5/2011 | Godavari .............. G06F 3/0416 345/650 |
| 2015/0186024 A1* | 7/2015 | Hong .................. G06F 3/04886 715/800 |

FOREIGN PATENT DOCUMENTS

| CN | 102207812 A | 10/2011 |
| CN | 103116454 A | 5/2013 |

(Continued)

OTHER PUBLICATIONS

How to use Snap assist on Windows 10 (published on Jun. 1, 2018, by Mauro Huculak).*

(Continued)

*Primary Examiner* — Rinna Yi
(74) *Attorney, Agent, or Firm* — BakerHostetler

(57) ABSTRACT

A method, apparatus and device for displaying windows in a split-screen manner are provided, which are applied to an intelligent terminal. The intelligent terminal is connected to the large-screen display, and the large-screen display displays the multiple windows. The intelligent terminal receives, in real time, the touch-point position information sent by the large-screen display, where the touch-point position information is acquired by the large-screen display when the operation which drags the at least two windows is detected, and there is a touch point in the preset dragging region of each of the at least two windows. In a case that the intelligent terminal determines that the touch-point position information meets the preset position condition and receives the touch-point disappearing information sent by the large-screen display, the intelligent terminal controls the at least two windows to be displayed in the split-screen manner.

20 Claims, 6 Drawing Sheets

(51) Int. Cl.
   *G06F 3/0481*   (2013.01)
   *G09G 5/14*     (2006.01)

(56) References Cited

FOREIGN PATENT DOCUMENTS

| CN | 103312718 A | 9/2013 |
| CN | 103677711 A | 3/2014 |
| CN | 103888809 A | 6/2014 |
| CN | 103914221 A | 7/2014 |
| CN | 104090720 A | 10/2014 |
| CN | 106598429 A | 4/2017 |

OTHER PUBLICATIONS

International Patent Application No. PCT/CN2019/081083; Int'l Search Report; dated Jun. 27, 2019; 2 pages.

* cited by examiner

WINDOW SPLIT SCREEN DISPLAY METHOD, DEVICE AND EQUIPMENT

The present application is a continuation of International Patent Application No. PCT/CN2019/081083, titled "WINDOW SPLIT SCREEN DISPLAY METHOD, DEVICE AND EQUIPMENT", filed on Apr. 2, 2019, which claims the priority to Chinese Patent Application No. 201810283284.8, titled "WINDOW SPLIT SCREEN DISPLAY METHOD, DEVICE AND EQUIPMENT", filed on Apr. 2, 2018 with the Chinese Patent Office, both of which are incorporated herein by reference in their entireties.

TECHNICAL FIELD

The present disclosure relates to the field of interne, and in particular to a method, an apparatus and a device for displaying windows in a split-screen manner.

BACKGROUND

Recently, there has been rapid development of techniques in the field of human-computer interaction. Human-computer interaction techniques refer to techniques for efficiently implementing a conversation between a human and a computer via an input device and an output device of a computer. Blooming as the most high-profile future technology at present, artificial intelligence (AI) has an increasingly wide application to the field of human-computer interaction.

At present, as a type of human-computer interaction, interaction between an AI large-screen and a human is increasingly used in various aspects such as office work and learning. With development of the AI large-screen, it is expected that a large screen display is capable of displaying multiple windows simultaneously, for example, displaying a video player window and a Word document editing window simultaneously, so as to facilitate a user recording view comments by using the Word document editing window while a player is playing a video. In practice, in the conventional technology, the user may gradually adjust positions of windows in the large-screen display only by operating a mouse, and sometimes switching among multiple windows is needed for adjustment. Moreover, to achieve a better split screen of the windows, in a case that the multiple displayed windows overlap partially, the user is required to move the mouse repeatedly and switch the windows repeatedly to adjust window positions. Not only the operation is complicated, but also an accurate split screen cannot be achieved for the multiple windows, which results in bad user experience.

SUMMARY

To address the above issue, a method, an apparatus and a device for displaying windows in a split-screen manner are provided according to the present disclosure. Specific technical solutions are as follows.

In a first aspect, a method for displaying windows in a split-screen manner is provided according to the present disclosure, where the method is applied to an intelligent terminal, the intelligent terminal is connected to a large-screen display, the large-screen display displays multiple windows, and the method includes:

receiving in real time, by the intelligent terminal, touch-point position information sent by the large-screen display, where the touch-point position information is acquired by the large-screen display when an operation which drags at least two windows is detected, and a touch point exists in a preset dragging region of each of the at least two windows; and controlling, by the intelligent terminal, the at least two windows to be displayed in a split-screen manner, in a case that the intelligent terminal determines that the touch-point position information meets a preset position condition, and receives touch-point disappearing information sent by the large-screen display.

In an optional implementation, controlling, by the intelligent terminal, the at least two windows to be displayed in the split-screen manner, in a case that the intelligent terminal determines that the touch-point position information meets the preset position condition, and receives the touch-point disappearing information sent by the large-screen display includes:

determining, by the intelligent terminal in real time, whether the touch-point position information meets the preset position condition;

controlling, by the intelligent terminal, to display a preview effect of the at least two windows displayed in the split-screen manner, in a case that the intelligent terminal determines that the touch-point position information meets the preset position condition; and controlling, by the intelligent terminal, the at least two windows to be displayed in the split-screen manner, in a case that the intelligent terminal receives the touch-point disappearing information sent by the large-screen display.

In an optional implementation, the at least two windows are three windows, and each of the three windows corresponds to one touch point, and determining that the touch-point position information meets the preset position condition includes:

determining, by the intelligent terminal in real time, whether the three touch points are aligned in a straight line, based on the touch-point position information, and determining, in a case that the three touch points are determined to be aligned in the straight line, whether a largest distance among the three touch points is smaller than a preset first threshold based on the touch-point position information, where in a case that the largest distance among the three touch points is smaller than the preset first threshold, it is determined that the touch-point position information meets the preset position condition; and determining, by the intelligent terminal in a case that the three touch points are determined to be not aligned in a straight line, whether a radius of a circumcircle of the three touch points is smaller than a preset second threshold based on the touch-point position information, where in a case that the radius of the circumcircle of the three touch points is smaller than the preset second threshold, it is determined that the touch-point position information meets the preset position condition.

In an optional implementation, the at least two windows are two windows, and each of the two windows corresponds to one touch point, and determining that the touch-point position information meets the preset position condition includes:

determining, by the intelligent terminal in real time, whether a distance between the two touch points is smaller than a preset third threshold based on the touch-point position information, where in a case that the distance between the two touch points is smaller than the preset third threshold, it is determined that the touch-point position information meets the preset position condition.

In an optional implementation, the controlling, by the intelligent terminal, to display the preview effect of the at least two windows displayed in the split-screen manner, in a case that the intelligent terminal determines that the touch-point position information meets the preset position condition includes:

controlling, by the intelligent terminal, to display in a manner of a blurred full-screen window, the preview effect of the at least two windows displayed in the split-screen manner, in a case that the intelligent terminal determines that the touch-point position information meets the preset position condition.

In an optional implementation, after controlling the at least two windows to be displayed in the split-screen manner, the method further includes:

receiving, by the intelligent terminal, position adjusting information of a split-screen display boundary from the large-screen display, where the position adjusting information of the split-screen display boundary is acquired by the large-screen display after detecting an operation which adjusts the split-screen display boundary; and adjusting, by the intelligent terminal, a size of the at least two windows displayed in the split-screen manner based on the position adjusting information of the split-screen display boundary.

In an optional implementation, the controlling, by the intelligent terminal, the at least two windows to be displayed in the split-screen manner, in a case that the intelligent terminal determines that the touch-point position information meets the preset position condition, and receives the touch-point disappearing information sent by the large-screen display, includes:

determining, by the intelligent terminal, a display position of the at least two windows based on newest touch-point position information, in a case that the intelligent terminal determines that the touch-point position information meets the preset position condition and receives the touch-point disappearing information sent by the large-screen display, and controlling, by the intelligent terminal based on the display position, the at least two windows to be displayed in the split-screen manner.

In an optional implementation, before determining the display position of the at least two windows based on the newest touch-point position information, the method further includes:

determining, by the intelligent terminal, position movement information of a touch point of each of the at least two windows, where the position movement information includes a start point and an end point of position movement of the touch point; and determining, by the intelligent terminal, the end point indicated by the position movement information as a newest touch-point position corresponding to the touch point of the window, where the determining the display position of the at least two windows based on the newest touch-point position information includes:

determining, by the intelligent terminal, the display position of the at least two windows based on the newest touch-point position determined based on the position movement information corresponding to each of the at least two windows.

In an optional implementation, the controlling, by the intelligent terminal, the at least two windows to be displayed in a split-screen manner, in a case that the intelligent terminal determines that the touch-point position information meets a preset position condition, and receives touch-point disappearing information sent by the large-screen display, includes:

determining, by the intelligent terminal, a split-screen ratio of the at least two windows displayed in the split-screen manner based on newest touch-point position information, in a case that the intelligent terminal determines that the touch-point position information meets the preset position condition, and receives the touch-point disappearing information sent by the large-screen display.

In an optional implementation, the at least two touch points are two touch points, and the determining the split-screen ratio of the at least two windows displayed in the split-screen manner based on the newest touch-point position information includes:

determining a display ratio of a window corresponding to each of the two touch points based on a distance between a screen margin and a newest touch-point position corresponding to the touch point.

In an optional implementation, a window split-screen display boundary of the at least two windows displayed in the split-screen manner passes through a center of a circumcircle of the touch points or passes through one of the touch points.

In a second aspect, an apparatus for displaying windows in a split-screen manner is provided according to the present disclosure, where the apparatus is applied to an intelligent terminal, the intelligent terminal is connected to a large-screen display, the large-screen display displays multiple windows, and the apparatus includes:

a receiving unit, configured to receive, in real time, touch-point position information sent by the large-screen display, where the touch-point position information is acquired by the large-screen display when an operation which drags at least two windows is detected, and a touch point exists in a preset dragging region of each of the at least two windows; and a split screen displaying unit, configured to control the at least two windows to be displayed in a split-screen manner, in a case that the touch-point position information is determined to meet a preset position condition, and touch-point disappearing information sent by the large-screen display is received.

In an optional implementation, the split screen displaying unit includes:

a determining unit, configured to determining, in real time, whether the touch-point position information meets the preset position condition;

a displaying unit, configured to control to display a preview effect of the at least two windows displayed in the split-screen manner, in a case that the touch-point position information is determined to meet the preset position condition; and a first split screen displaying subunit, configured to control the at least two windows to be displayed in the split-screen manner, in a case that the touch-point disappearing information sent by the large-screen display is received.

In an optional implementation, the at least two windows of the first split screen displaying subunit are three windows, and each of the three windows corresponds to one touch point, and the split screen displaying unit is further configured to:

determine, in real time, whether the three touch points are aligned in a straight line based on the touch-point position information, and determine, in a case that the three touch points are determined to be aligned in the straight line, whether a largest distance among the three touch points is smaller than a preset first threshold based on the touch-point position information, where in a case that the largest distance among the three touch points is smaller than the preset first threshold, it is determined that the touch-point position information meets the preset position condition; and determine, in a case that the three touch points are determined to be not aligned in the straight line, whether a radius of a circumcircle of the three touch points is smaller than a preset second threshold based on the touch-point position information, where in a case that the radius of the circumcircle of the three touch points is smaller than the preset second threshold, it is determined that the touch-point position information meets the preset position condition.

In an optional implementation, the at least two windows of the first split screen displaying subunit are two windows, and each of the two windows corresponds to one touch point, and the split screen displaying unit is further configured to:

determine, in real time, whether a distance between the two touch points is smaller than a preset third threshold based on the touch-point position information, where in a case that the distance between the two touch points is smaller than the preset third threshold, it is determined that the touch-point position information meets the preset position condition.

In an optional implementation, the displaying unit includes:

a displaying subunit, configured to control to display in a manner of a blurred full-screen window, the preview effect of the at least two windows displayed in the split-screen manner, in a case that the touch-point position information is determined to meet the preset position condition.

In an optional implementation, the apparatus further includes:

a receiving subunit, configured to receive position adjusting information of a split-screen display boundary from the large-screen display, where the position adjusting information of the split-screen display boundary is acquired by the large-screen display after detecting an operation which adjusts the split-screen display boundary; and an adjusting unit, configured to adjust a size of the at least two windows displayed in the split-screen manner based on the position adjusting information of the split-screen display boundary.

In an optional implementation, the split screen displaying unit includes:

a second split screen displaying subunit, configured to determine a display position of the at least two windows based on newest touch-point position information, in a case that the touch-point position information is determined to meet the preset position condition and touch-point disappearing information sent by the large-screen display is received, and control based on the display position, the at least two windows to be displayed in the split-screen manner.

In an optional implementation, a display position of the at least two windows is determined based on newest touch-point position information in a case that the touch-point position information is determined to meet the preset position condition and touch-point disappearing information sent by the large-screen display is received, the at least two windows is controlled, based on the display position, to be displayed in the split-screen manner.

In an optional implementation, the split screen displaying unit is further configured to:

determine a split-screen ratio of the at least two windows displayed in the split-screen manner based on newest touch-point position information of the touch point, in a case that the touch-point position information is determined to meet the preset position condition, and the touch-point disappearing information sent by the large-screen display is received.

In an optional implementation, the at least two touch points are two touch points, and the split screen displaying unit is further configured to:

determine a display ratio of a window corresponding to each of the two touch points based on a distance between a screen margin and a newest touch-point position corresponding to the touch point.

In an optional implementation, a window split-screen display boundary of the at least two windows displayed in the split-screen manner passes through a center of a circumcircle of the touch points or passes through one of the touch points.

In a third aspect, a device for displaying windows in a split-screen manner is provided according to the present disclosure, where the device includes a memory and a processor, the memory is configured to store program codes, and transmit the program codes to the processor, and the processor is configured to perform, according to instructions of the program code, any one of the methods for displaying the windows in the split-screen manner according to the aforementioned first aspect.

In the method for displaying windows in a split-screen manner according to the present disclosure, the intelligent terminal is connected to the large-screen display, and the large-screen display displays the multiple windows. The intelligent terminal receives, in real time, the touch-point position information sent by the large-screen display, where the touch-point position information is acquired by the large-screen display when the operation which drags the at least two windows is detected, and there is a touch point in the preset dragging region of each of the at least two windows. In a case that the intelligent terminal determines that the touch-point position information meets the preset position condition and receives the touch-point disappearing information sent by the large-screen display, the intelligent terminal controls the at least two windows to be displayed in the split-screen manner. According to the present disclosure, displaying windows in a split-screen manner is achieved with a touch control based on a user's will, for the multiple windows displayed on the large-screen display, which increases operating convenience for the user and improves experience of the user.

BRIEF DESCRIPTION OF THE DRAWINGS

For clearer illustration of the technical solutions of embodiments of the present disclosure, drawings used in the description of the embodiments are introduced briefly hereinafter. Apparently, the drawings in the following description only illustrate some embodiments of the present disclosure, and other drawings may be obtained by those skilled in the art based on these drawings without creative efforts.

DETAILED DESCRIPTION OF THE EMBODIMENTS

The technical solutions of the embodiments of the present disclosure will be described clearly and completely as follows in conjunction with the drawings of the embodiments of the present application. It is apparent that the described embodiments are only a few rather than all the embodiments of the present disclosure. All other embodiments obtained by those skilled in the art based on the embodiments in the present disclosure without any creative efforts fall within the protection scope of the present disclosure.

In order to facilitate understanding of the technical solutions of the present disclosure, hereinafter a practical application scene of the present disclosure is introduced.

Figure 1:
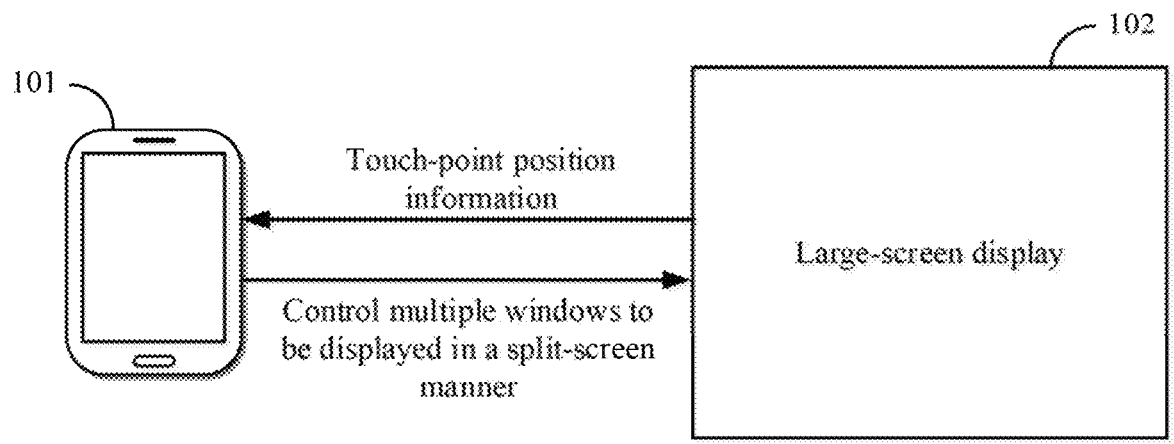
FIG. 1 is a schematic block diagram of an exemplary application scene according to an embodiment of the present disclosure.

Reference is made to FIG. 1, which shows a schematic block diagram of an exemplary application scene according to an embodiment of the present disclosure. As shown in FIG. 1, a method for displaying windows in a split-screen manner according to the present disclosure may be applied to an application scene including an intelligent terminal 101 and a large-screen display 102. The intelligent terminal 101 refers to any user equipment capable of establishing connection with the large-screen display 102, to achieve human-computer interaction with a user, so as to control the large-screen display 102 based on touch-point position information sent by the large-screen display 102, such as an intelligent mobile phone, a tablet computer, and a laptop personal computer. The large-screen display 102 refers to a large-screen displaying device capable of communicating with the intelligent terminal 101 and displaying multiple windows for the intelligent terminal 101, such as a large screen in a direct-view color television or a rear projection television, where a diagonal size of the screen may be greater than 40 inches. Alternatively, the large-screen display 102 may be a display of the intelligent terminal 101 itself, and the large-screen display 102 may communicate with the information processing system of the intelligent terminal 101.

In a practical application, the intelligent terminal 101 may be connected to the large-screen display 102, so that the multiple windows of the intelligent terminal may be displayed on the large-screen display 102, for example, a Word document window and a video player window, may be simultaneously displayed. The large-screen display 102 sends in real time the touch-point position information to the intelligent terminal 101 on detecting that the multiple windows are dragged by an operation of a user, for example, detecting that the Word document window and the video player window are simultaneously dragged by the operation of the user. The intelligent terminal 101 determines whether the touch-point position information meets a preset position condition after receiving, in real time, the touch-point position information sent by the large-screen display 102. The intelligent terminal 101 controls the multiple windows to be displayed in a split-screen manner, in a case that it is determined that the touch-point position information meets the present position condition, and touch-point disappearing information sent by the large screen display is received. In this way, displaying windows in a split-screen manner can be achieved with a touch control based on a user's will, increasing operation convenience for the user and improving experience of the user.

Based on the above application scene, a method for displaying windows in a split-screen manner is provided according to an embodiment of the present disclosure. Hereinafter the method is illustrated in detail in combination with drawings. The large-screen display exemplified below may be a large-screen device such as a large screen in a direct-view color television or a rear projection television, or the large-screen display may be a display of the intelligent terminal itself.

Figure 2:
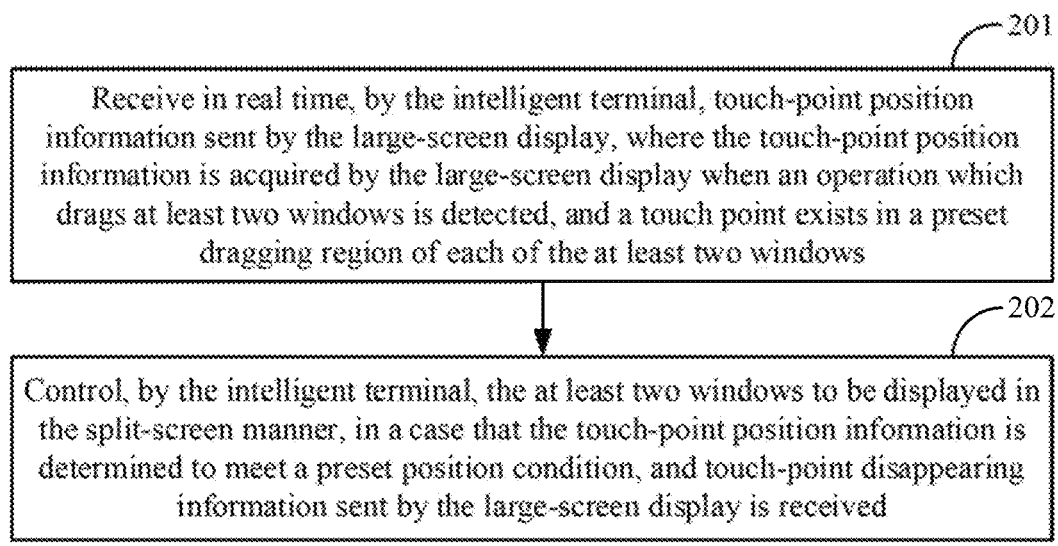
FIG. 2 is a flowchart of a method for displaying windows in a split-screen manner according to an embodiment of the present disclosure.

Reference is made to FIG. 2, which shows a flowchart of a method for displaying windows in a split-screen manner according to an embodiment of the present disclosure. As shown in FIG. 2, the method includes step 201 and step 202.

In step 201, an intelligent terminal receives, in real time, touch-point position information sent by a large-screen display, where the touch-point position information is acquired by the large-screen display when an operation which drags at least two windows is detected, and a touch point exists in a preset dragging region of each of the at least two windows.

In a practical application, the intelligent terminal may establish connection with the large-screen display, thereby displaying on the large-screen display various application windows opened in the intelligent terminal. That is, multiple windows of the intelligent terminal are displayed on the large-screen display. Then, the user may perform a touch operation on a window which is displayed on the large-screen display and opened in the intelligent terminal. For example, the user may simultaneously touch preset dragging regions of the multiple windows, and perform dragging operations on the multiple windows.

In a case that the large-screen display detects that the user performs a touch operation on the large-screen display, touch-point position information is sent in real time to the intelligent terminal connected to the large-screen display, where the touch-point position information is acquired by the large-screen display when the operation which drags at least two windows is detected, and a touch point exists in the preset dragging region of each of the at least two windows touched and dragged by the user. Therefore, for the touch-point position information, the touch point is distributed in the preset dragging region of the corresponding window.

For example, it is assumed that the intelligent terminal is an intelligent mobile phone A, and is connected to the large-screen display. Three windows opened in the intelligent terminal are displayed on the large-screen display, which are a Word document window, a video player, and a shopping website window, respectively. The touch point distributes within the preset dragging region of the corresponding window, when fingers of the user perform touch operations on the three windows. In a case that the large-screen display detects in real time that the user performs dragging operations on the three windows, the large-screen display may determine the touch-point position information of touch of the user on the three windows, and send the touch-point position information in real time to the mobile phone A, so that the mobile phone A continues to perform a next step.

In step 202, the intelligent terminal controls the at least two windows to be displayed in a split-screen manner, in a case that it is determined that the touch-point position information meets a preset position condition and touch-point disappearing information sent by the large-screen display is received.

In a practical application, the intelligent terminal determines whether the touch-point position meets the preset position condition, after the touch-point position information sent by the large-screen display is received in real time. The preset position condition refers to a condition preset by the intelligent terminal. In some possible implementations of the present disclosure, in a case that the at least two windows are three windows, and each of the three windows corresponds to one touch point, the intelligent terminal determining whether the touch-point position information meets the preset position condition includes:

the intelligent terminal determines in real time whether the three touch points are aligned in a straight line based on the touch-point position information, and in a case that it is determined that the three touch points are aligned in the straight line, determines based on the touch-point position information, whether a largest distance among the three touch points is smaller than a preset first threshold; and in a case that it is determined that the three touch points are not aligned in a straight line, the intelligent terminal determines, based on the touch-point position information, whether a radius of a circumcircle of the three touch points is smaller than a preset second threshold.

In some other possible implementations of the present disclosure, in a case that the at least two windows are two windows, and each of the two windows corresponds to one touch point, the intelligent terminal determining whether the touch-point position information meets the preset position condition includes that the intelligent terminal determines in real time, based on the touch-point position information, whether a distance between the two touch points is smaller than a preset third threshold.

The intelligent terminal controls the at least two windows to be displayed in the split-screen manner, in case that the touch-point disappearing information sent by the display is received. The touch-point disappearing refers to that the user no longer performs the touch operation on the windows on the large-screen display, i.e., the user lifts the fingers and no longer touches the windows on the screen of the large-screen display.

For example, it is assumed that the intelligent terminal is an intelligent mobile phone B, and is connected to the large-screen display. Two windows opened in the intelligent terminal are displayed on the large-screen display, which are a Word document window and a video displayer window, respectively. It is assumed that if the preset position condition is that a distance between the touch points of the two windows is not greater than 1 centimeter, it can be continued to perform a window split-screen operation. Thereby, the mobile phone B may determine whether the distance between positions of the touch points of the touch on the two windows is not greater than 1 centimeter, in a case that the large-screen display sends to the mobile phone B the detected touch-point position information of the touch of the user on the Word document window and the video player window. In case of a positive determination, it is continued to perform the window split-screen operation; and in case of a negative determination, the window split-screen operation is not to be performed.

Further, after determining that the touch-point position information meets the preset position condition, the intelligent terminal controls the at least two windows to be displayed in the split-screen manner in a case that the touch-point disappearing information sent by the large-screen display is received. That is, after determining that the touch-point position information meets the preset position condition, the intelligent terminal does not control the at least two windows to be displayed in the split-screen manner until the touch-point disappearing information sent by the large-screen display is received. A final window split-screen operation is achieved only in a case that the two conditions are both met.

In the step 202, according to an optional implementation, the intelligent terminal controlling the at least two windows to be displayed in the split-screen manner in a case that the intelligent terminal determines that the touch-point position information meets the preset position condition and receives the touch-point disappearing information sent by the large-screen display includes:

the intelligent terminal determines in real time whether the touch-point position information meets the preset position condition;

the intelligent terminal controls to display a preview effect of the at least two windows displayed in the split-screen manner, in case that the intelligent terminal determines that the touch-point position information meets the preset position condition; and the intelligent terminal controls the at least two windows to be displayed in the split-screen manner, in case that the touch-point disappearing information sent by the large-screen display is received.

In a practical application, after receiving in real time the touch-point position information sent by large-screen display, the intelligent terminal determines whether the touch-point position information meets the preset position condition. The intelligent terminal controls to display the preview effect of the at least two windows displayed in the split-screen manner on the large-screen display, in case that the intelligent terminal determines that the touch-point position information meets the preset position condition. The preview effect refers to an effect of the at least two windows displayed in the split-screen manner on the large-screen display after the split-screen operation is performed, and can be used for previewing by the user. If such a display effect is required by the user, the user can make the touch points disappear by lifting the fingers. In this case, the large-screen display detects the touch-point disappearing information and sends to the intelligent terminal the touch-point disappearing information. The intelligent terminal controls in real time the at least two windows to be displayed in the split-screen manner on the large-screen display, in case that the touch-point disappearing information sent by the large-screen display is received.

Figure 3:
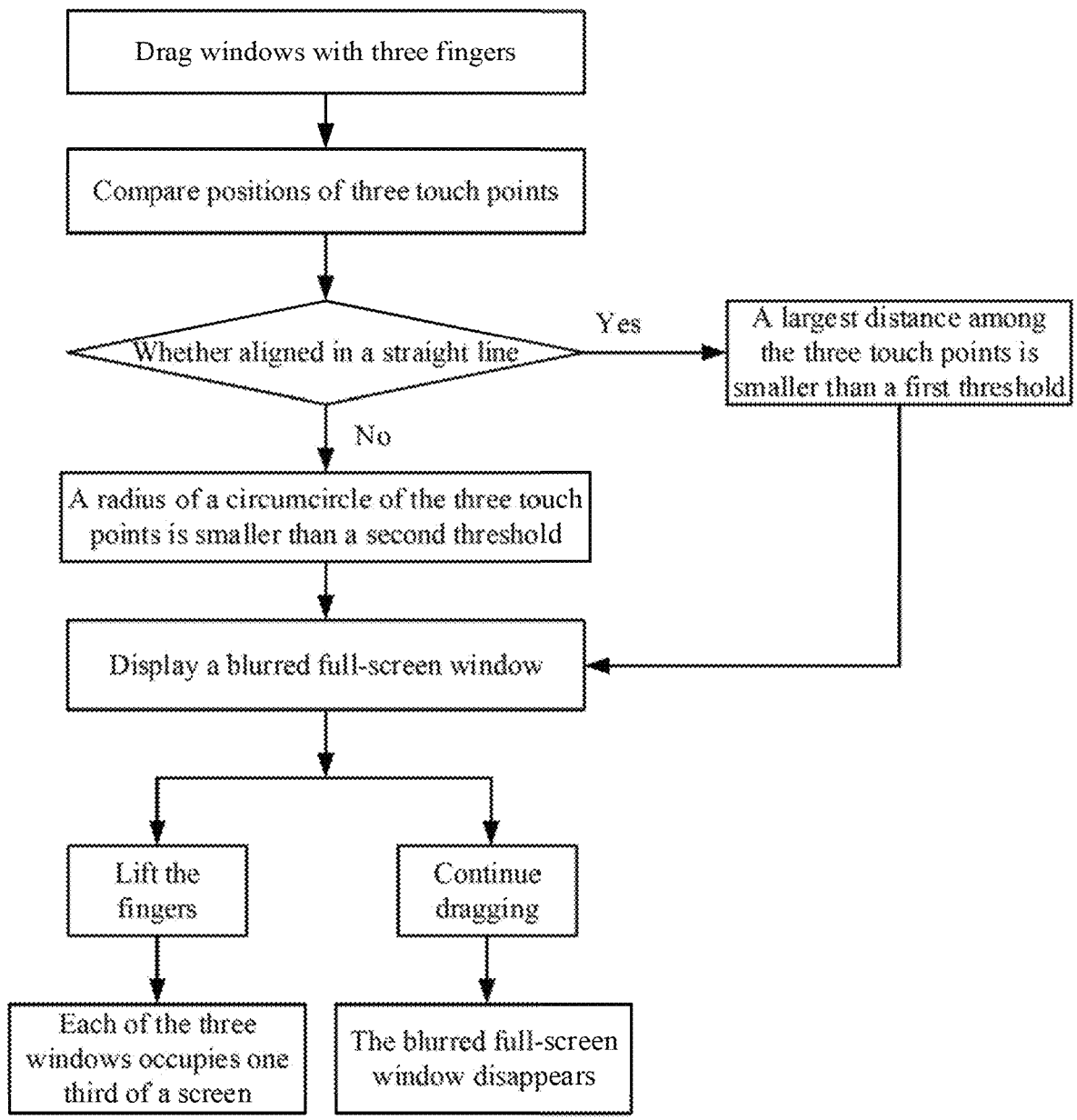
FIG. 3 is a flowchart of a method for displaying three windows in a split-screen manner according to an embodiment of the present disclosure.

In an embodiment of the present disclosure, in a case that the at least two windows are three windows, and each of the three windows corresponds to one touch point, a process to achieve split-screen display of the three windows is shown as in FIG. 3.

The intelligent terminal determines in real time whether the touch-point position information meets the preset position condition specifically as follows. When three fingers drag the three windows simultaneously, the large-screen display detects three touch points which correspond to the three windows respectively, and sends to the intelligent terminal real-time position information of the three touch points. After receiving in real time the position information of the three touch points, the intelligent terminal compares the position information of the three touch points, and determines whether positions of the three touch points are aligned in a straight line. In a case that the three touch points are aligned in the straight line, it is further determined whether a largest distance among the three touch points is smaller than a first threshold, where the first threshold is a preset value than which the largest distance among the three touch points is required to be smaller in a case that the split-screen display is feasible and the touch points of the three windows are aligned in the straight line. The preset value serves as a critical value for determining whether the three windows can be displayed in a split-screen manner in the subsequent. For example, the first threshold may be 2 centimeter, and a subsequent split-screen operation for the three windows can be performed in a case the largest distance among the three touch points is smaller than 2 centimeter, otherwise, the subsequent split-screen operation for the three windows is not to be performed.

In a case that the three touch points are not aligned in the straight line, it is determined whether a radius of a circumcircle of the three touch points is smaller than a second threshold, where the second threshold is a preset value than which the radius of the circumcircle of the three touch points is required to be smaller in a case that the split-screen display is feasible and the touch points of the three windows are not aligned in the straight line. The preset value serves as a critical value for determining whether the three windows can be displayed in a split-screen manner in the subsequent. For example, the second threshold may be 1.2 centimeter, and a subsequent split-screen operation for the three windows can be performed in a case the radius of the circumcircle of the three touch points is smaller than 1.2 centimeter, otherwise, the subsequent split-screen operation for the three windows is not to be performed.

Further, in a case that the intelligent terminal determines in real time that the position information of the three touch points meets the preset position condition, i.e., the three touch points are aligned in the straight line and the largest distance among the three touch points is smaller than the first threshold, or the three touch points are not aligned in the straight line and the radius of the circumcircle of the three touch points is smaller than the preset second threshold, a blurred full-screen window may be displayed on the large-screen display, where the blurred full-screen window is the preview effect of displaying the three windows in the split-screen manner, and can be used for previewing by the user. If such a display effect is desired by the user, the user can make the touch points disappear by lifting fingers. In this case, the large-screen display detects the touch-point disappearing information and sends the touch-point disappearing information to the intelligent terminal. The intelligent terminal controls in real time the three windows to be displayed by each occupying one third of the screen, when receiving the touch-point disappearing information. If such a display effect is not desired by the user, the user can continue to drag the window so that the blurred full-screen window disappears, and then the user lifts the fingers so that the operation for displaying the three windows in the split-screen manner is not to be performed.

Figure 4:
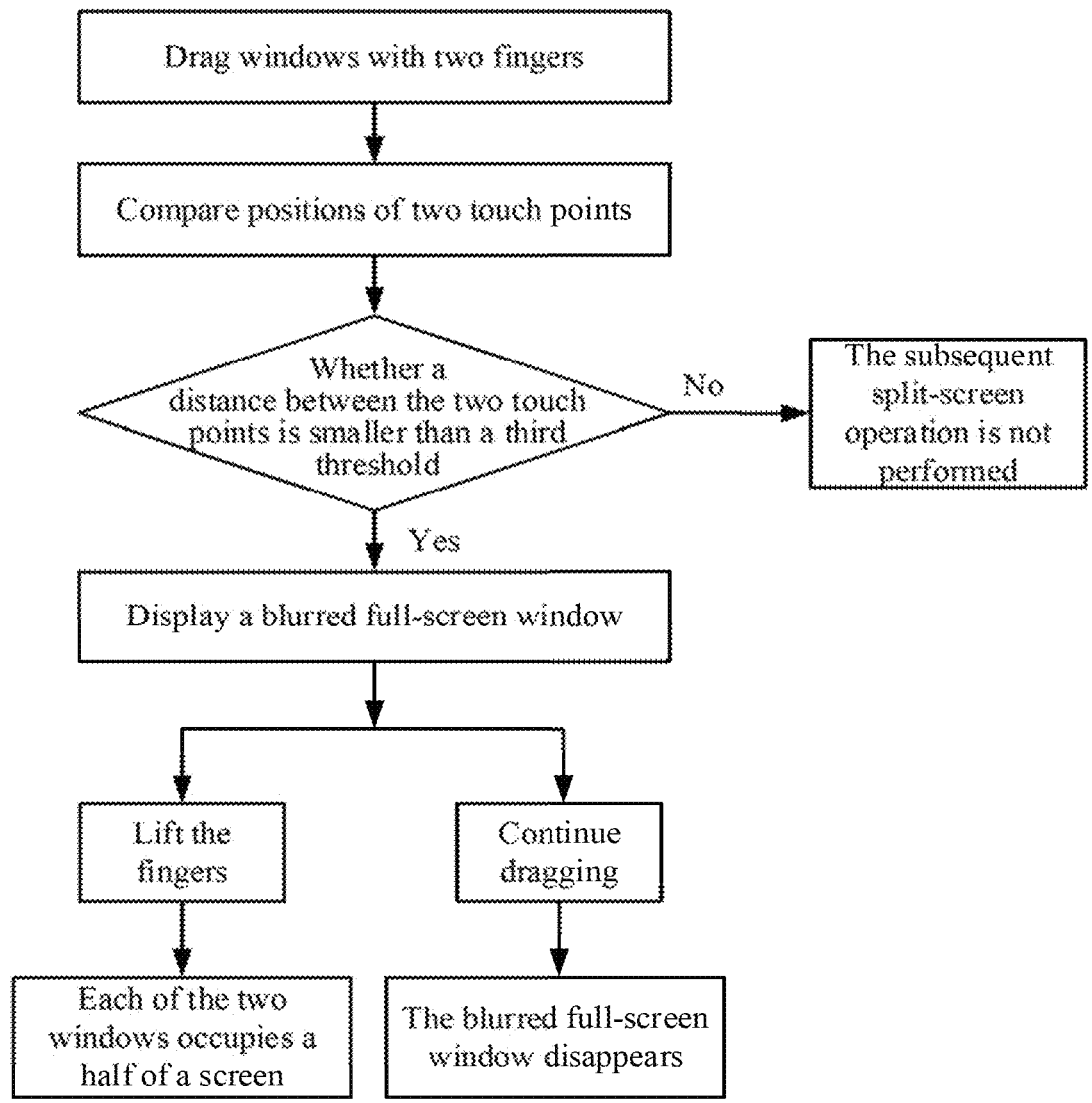
FIG. 4 is a flowchart of a method for displaying two windows in a split-screen manner according to an embodiment of the present disclosure.

In an embodiment of the present disclosure, in a case that the at least two windows are two windows, and each of the two windows corresponds to one touch point, a process to achieve split-screen display of the two windows is as shown in FIG. 4.

The intelligent terminal determines in real time whether the touch-point position information meets the preset position condition specifically as follows. When two fingers drag the two windows simultaneously, the large-screen display detects two touch points which correspond to the three windows respectively, and sends to the intelligent terminal real-time position information of the two touch points. After receiving in real time the position information of the two touch points, the intelligent terminal compares the position information of the two touch points, and determines whether a distance between the two touch points is smaller than a third threshold, where the third threshold is a preset value than which the distance between the touch points corresponding to the two windows is required to be smaller in a case that the split-screen display is feasible. The preset value serves as a critical value for determining whether the two windows can be displayed in a split-screen manner in the subsequent. For example, the third threshold may be 1 centimeter, and a subsequent split-screen operation for the two windows can be performed in a case the distance between the two touch points corresponding to the two windows is smaller than 1 centimeter, otherwise, the subsequent split-screen operation for the two windows is not to be performed.

Further, in a case that the intelligent terminal determines in real time that the distance between the two touch points is smaller than the third threshold, a blurred full-screen window may be displayed on the large-screen display. Similarly, the blurred full-screen window is the preview effect of displaying the two windows in the split-screen manner, and can be used for previewing by the user. If such a display effect is desired by the user, the user can make the touch points disappear by lifting fingers. In this case, the large-screen display detects the touch-point disappearing information and sends the touch-point disappearing information to the intelligent terminal. The intelligent terminal controls in real time the two windows to be displayed by each occupying a half of the screen, when the touch-point disappearing information is received. If such a display effect is not desired by the user, the user may continue to drag the window so that the blurred full-screen window disappears, and then the user lifts the fingers so that the operation for displaying the two windows in the split-screen manner is not to be performed.

It should be noted that all the aforementioned thresholds may be set according to a practical situation, which are not limited in the present disclosure.

In some possible implementations of the present disclosure, the intelligent terminal controlling to display the preview effect of the at least two windows displayed in the split-screen manner in a case that the intelligent terminal determines that the touch-point position information meets the preset position condition includes:

the intelligent terminal controls to display, in a manner of a blurred full-screen window, the preview effect of the at least two windows displayed in the split-screen manner, in a case that the intelligent terminal determines that the touch-point position information meets the preset position condition.

In a practical application, in case that the intelligent terminal determines that the received touch-point position information meets the preset position condition, displaying the windows in the split-screen manner may be performed. Before achieving the split-screen display of the at least two windows, the preview effect of the at least two windows displayed in the split-screen manner is controlled to be displayed in a manner of the blurred full-screen window, so that the user previews and determines whether a final split-screen display of the at least two windows is to be achieved.

For example, it is assumed that the at least two windows are three windows. In case that the intelligent terminal determines that received positions of the three touch points meet the preset position condition, i.e., the three touch points are aligned in the straight line and the largest distance among the three touch points is smaller than the preset first threshold such as 1 centimeter, or the three touch points are not aligned in the straight line and the radius of the circumcircle of the three touch points is smaller than the preset second threshold such as 1.5 centimeter, the blurred full-screen window is displayed on the large-screen display before the split-screen display of the three windows is achieved. The blurred full-screen window is the preview effect of displaying the three windows in the split-screen manner and can be used for previewing by the user. The user determines, based on the preview effect, whether the final split-screen display of the three windows is desired to be achieved.

In some possible implementations of the present disclosure, after controlling the at least two windows to be displayed in the split-screen manner, the method further includes:

the intelligent terminal receives position adjusting information of a split-screen display boundary from the large-screen display, where the position adjusting information of the split-screen display boundary is acquired by the large-screen display after an operation which adjusts the split-screen display boundary is received; and the intelligent terminal adjusts, based on the position adjusting information of the split-screen display boundary, a size of the at least two windows displayed in the split-screen manner.

In a practical application, after the intelligent terminal controls the at least two windows to be displayed on the display in the split-screen manner, the user may adjust according to a requirement of the user, a window-to-screen ratio of the windows displayed in the split-screen manner. An adjustment manner is to adjust the split-screen display boundary. In a case that an operation of the user for adjusting the split-screen display boundary is detected by the large-screen display, the large-screen display acquires the position adjusting information of the split-screen display boundary, and sends to the intelligent terminal the position adjusting information of the split-screen display boundary, so as to cause the intelligent terminal to adjust, based on the position adjusting information of the split-screen display boundary, the size of the at least two windows displayed in the split-screen manner, i.e., adjusting, according to the user's will, the window-to-screen ratio of the at least two windows displayed in the split-screen manner.

In some application scenarios, when the touch-point position information is determined to meet the preset position condition, and the touch point disappearing information sent by the large-screen display is received, the intelligent terminal controlling to display the at least two windows in the split-screen manner may include: when the touch-point position information is determined to meet the preset position condition, and the touch point disappearing information sent by the large-screen display is received, determining a split-screen ratio of the split-screen displaying of at least two window points based on the newest touch-point position information.

As an exemplary illustration, if there are two touch points, and the first touch point is located on the left side of the screen, the second touch point is located on the right side of the screen. A distance between the first touch point and a left margin of the screen is ⅙ of a distance between the left and right margins of the screen. A distance between the second touch point and the right margin of the screen is ⅓ of the distance between the left and right margins of the screen, thus the window-to-screen ratio of a window corresponding to the second touch point is twice of the window-to-screen ratio of a window corresponding to the first touch point. That is, when the split-screen ratio of the two windows is determined based on the newest touch-point position information, distance between left and right margins of the window corresponding to the second touch point is twice that between left and right margins of the window corresponding to the first touch point.

As another example, the number of the touch points may be at least two. The at least two touch points may have a circumcircle. When the windows corresponding to the at least two touch points are displayed in the split-screen manner, the split-screen display boundary of the display window on the screen may pass through the center of the circumcircle of the touch points. Taking two touch points as an example, there are a first touch point and a second touch point distributed on the circumcircle. The split-screen display boundary between the window corresponding to the first touch point and the window corresponding to the second touch point passes through the center of the circumcircle. For example, the split-screen display boundary may be a straight line on which a diameter of the circumcircle is located.

As yet another example, the number of the touch points may be at least two. Each touch point corresponds to one window. The split-screen display boundary of the window corresponding to each of the at least two touch points may pass through at least one of the touch points. Taking two touch points as an example, the display boundary between the windows corresponding to the first touch point and the second touch point may be a straight line passing through the first touch point, or a straight line passing through the second touch point, or a straight line passing through the first touch point and the second touch point. For example, the display boundary between the windows corresponding to two touch points of the circumcircle may be a straight line passing through the diameter of the first touch point, the center of the circumcircle, and the second touch point.

Figure 5:
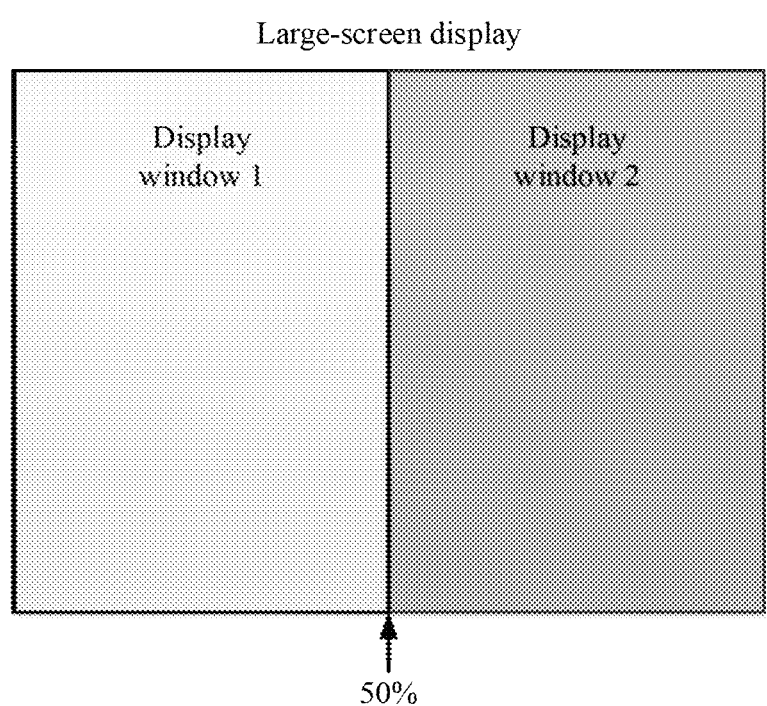
FIG. 5 is a schematic diagram of displaying two windows in a split-screen manner according to an embodiment of the present disclosure.

An example is described for illustration. Reference is made to FIG. 5, which shows a schematic diagram of displaying two windows in a split-screen manner according to the present disclosure.

Figure 6:
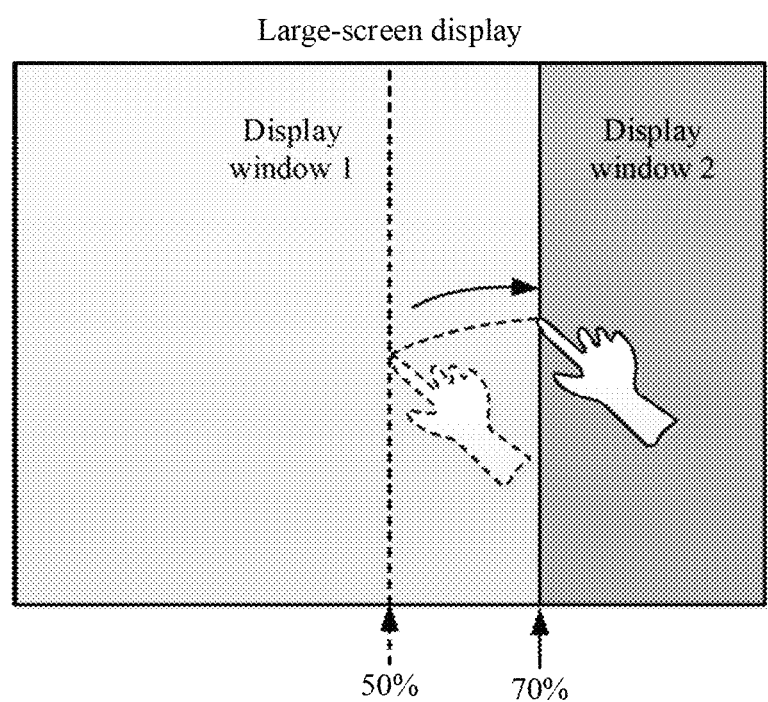
FIG. 6 is a schematic diagram of adjusting a split-screen display boundary of two windows according to an embodiment of the present disclosure.

When the intelligent terminal controls two windows to be displayed on a display in a split-screen manner, each of the two windows occupies a half-screen of the display, namely, a window 1 and a window 2 each occupy 50% of the screen. In a case that the user wants to increase a window-to-screen ratio of the window 1 and decrease a window-to-screen ratio of the window 2, for example, adjusting the window-toscreen ratio of the window 1 to be 70% and correspondingly reducing the window-to-screen ration of the window 2 to be 30%, the user may directly tap a split-screen display boundary of the window 1, and drag the split-screen display boundary to the right until that the window-to-screen ratio of the window 1 is 70%. In this case, the large-screen display acquires the position adjusting information of the split-screen display boundary of the window 1, and sends to the intelligent terminal the position adjusting information of the split-screen display boundary, so that the intelligent terminal adjusts sizes of the window 1 and the window 2, and the window-to-screen ratio of the window 1 is adjusted to be 70% and the window-to-screen ratio of the window 2 is adjusted to be 30%, which is as shown in FIG. 6. Therefore, increasing of the window 1 and decreasing of the window 2 can be simultaneously achieved by adjusting the split-screen display boundary of the window 1 via a user tap or the like, which improves experience of the user.

In the step 202, according to another optional implementation, the intelligent terminal controlling the at least two windows to be displayed in the split-screen manner in a case that the intelligent terminal determines that the touch-point position information meets the preset position condition, and receives touch-point disappearing information sent by the large-screen display includes:

in a case that the intelligent terminal determines that the touch-point position information meets the preset position condition, and receives touch-point disappearing information sent by the large-screen display, the intelligent terminal determines, based on newest touch-point position information, a display position of the at least two windows, and controls, based on the display position of the at least two windows, the at least two windows to be displayed in the split-screen manner.

In a practical application, in a case that the intelligent terminal determines that the touch-point position information meets the preset position condition and receives the touch-point disappearing information sent by the large-screen display, the intelligent terminal determines, based on the newest touch-point position information, the display position of the at least two windows, and controls, based on the display position of the at least two windows, the at least two windows to be displayed in the split-screen manner. The newest touch-point position information refers to a position of touch points at which the touch-point position information meets the preset position condition and the touch points no longer move. Usually, the split screen is displayed according to an original distribution condition of the windows. For example, at an original state, a window A is displayed at a left side of a display, a window B is displayed at a right side of the display, and a touch point corresponding to the window A is located on the left of a touch point corresponding to the window B. When the intelligent terminal determines that the touch-point position information of the touch points meets the preset position information, the intelligent terminal controls the two windows to be displayed in the split-screen manner, then the window A is displayed at a left half-screen, and the window B is displayed at a right half-screen. In a specific implementing process, the user touches and drags the window A and window B, and when position information of the touch points corresponding to the two windows meets the preset position information and the touch points no longer move, the touch point corresponding to the window B moves to the right of the touch point corresponding to the window A, which is different from original positions of the windows. According to the newest touch-point position information, when the touch-point disappearing information sent by the large-screen display is received, the intelligent terminal controls the window A to be displayed at the right half-screen, and the window B to be displayed at the left half-screen.

In this case, in the method for displaying the windows in the split-screen manner according to the present disclosure, the intelligent terminal is connected to the large-screen display, and the large-screen display displays the multiple windows. The intelligent terminal receives, in real time, the touch-point position information sent by the large-screen display, where the touch-point position information is acquired by the large-screen display when the operation which drags the at least two windows is detected, and the a touch point exists in the preset dragging region of each of the at least two windows. In a case that the intelligent terminal determines that the touch-point position information meets the preset position condition and receives the touch-point disappearing information sent by the large-screen display, the intelligent terminal controls the at least two windows to be displayed in the split-screen manner. It can be seen that, according to the present disclosure, displaying the windows in the split-screen manner is achieved with a touch control based on a user's will for the multiple windows displayed on the large-screen display, which improves operating convenience for the user, accuracy of the split screen, thereby improving the experience of the user.

Figure 7:
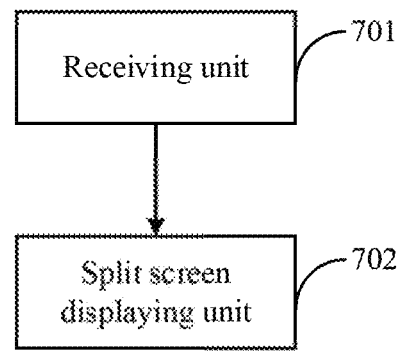
FIG. 7 is a schematic structural diagram of an apparatus for displaying windows in a split-screen manner according to an embodiment of the present disclosure.

On the basis of the aforementioned method for displaying the windows in the split-screen manner, an apparatus for displaying windows in a split-screen manner is further provided according to the present disclosure. The apparatus is applied to an intelligent terminal, the intelligent terminal is connected to a large-screen display, and the large-screen display displays multiple windows. As shown in FIG. 7, the apparatus includes a receiving unit 701 and a split screen displaying unit 702. The receiving unit 701 is configured to receive, in real time, touch-point position information sent by the large-screen display, where the touch-point position information is acquired by the large-screen display when an operation which drags at least two windows is detected, and a touch point exists in a preset dragging region of each of the at least two windows. The split screen displaying unit 702 is configured to control the at least two windows to be displayed in a split-screen manner, in a case that the touch-point position information is determined to meet a preset position condition, and touch-point disappearing information sent by the large-screen display is received.

Optionally, the split screen displaying unit 702 specifically includes a determining unit, a displaying unit, and a first split screen displaying subunit. The determining unit is configured to determine, in real time, whether the touch-point position information meets the preset position condition. The displaying unit is configured to control to display a preview effect of the at least two windows displayed in the split-screen manner, in a case that the touch-point position information is determined to meet the preset position condition. The first split screen displaying subunit is configured to control the at least two windows to be displayed in the split-screen manner, in a case that the touch-point disappearing information sent by the large-screen display is received.

Optionally, in a case that the at least two windows are three windows and each of the three windows corresponds to one touch point, the split screen displaying unit is further configured to:

determine, in real time, whether the three touch points are aligned in a straight line based on the touch-point position information, and in a case that it is determined that the three touch points are aligned in the straight line, determine, based on the touch-point position information, whether a largest distance among the three touch points is smaller than a preset first threshold, where in a case that it is determined that the largest distance among the three touch points is smaller than the preset first threshold, it is determined that the touch-point position information meets the preset position condition; and determine, based on the touch-point position information, whether a radius of a circumcircle of the three touch points is smaller than a preset second threshold in a case that the three touch points are determined to be not aligned in a straight line, where in a case that it is determined that the radius of the circumcircle of the three touch points is smaller than the preset second threshold, it is determined that the touch-point position information meets the preset position condition.

Optionally, in a case that the at least two windows are two windows and each of the two windows corresponds to one touch point, the split screen displaying unit is further configured to determine, in real time based on the touch-point position information, whether a distance between the two touch points is smaller than a preset third threshold, where in a case that the distance between the two touch points is smaller than the preset third threshold, it is determined that the touch-point position information meets the preset position condition.

Optionally, the displaying unit specifically includes a displaying subunit. The displaying subunit is configured to control to display, in a manner of a blurred full-screen window, the preview effect of the at least two windows displayed in the split-screen manner, in a case that the touch-point position information is determined to meet the preset position condition.

Optionally, the apparatus further includes a receiving subunit and an adjusting unit. The receiving subunit is configured to receive position adjusting information of a split-screen display boundary from the large-screen display, where the position adjusting information of the split-screen display boundary is acquired by the large-screen display after an operation which adjusts the split-screen display boundary is detected. The adjusting unit is configured to adjust, based on the position adjusting information of the split-screen display boundary, a size of the at least two windows displayed in the split-screen manner.

Optionally, the split screen displaying unit specifically includes a second split screen displaying subunit. The second split screen displaying subunit is configured to determine, based on newest touch-point position information, a display position of the at least two windows, in a case that the touch-point position information is determined to meet the preset position condition and touch-point disappearing information sent by the large-screen display is received, and control, based on the display position, the at least two windows to be displayed in the split-screen manner.

Optionally, before determining the display position of the at least two windows based on the newest touch-point position information, the second split screen displaying subunit is further configured to: determine, for each window by the intelligent terminal, position movement information of a touch point of the window, where the position movement information includes a start point and an end point of position movement of the touch point; determine the end point indicated by the position movement information as a newest touch-point position corresponding to the touch point of the window; and determine the display position of the at least two windows based on the newest touch-point position determined based on the position movement information corresponding to each window.

Optionally, the split screen displaying unit 702 is further configured to: determine a split-screen ratio of the at least two windows displayed in the split-screen manner based on newest touch-point position information of the touch point, in a case that the touch-point position information is determined to meet the preset position condition, and the touch-point disappearing information sent by the large-screen display is received.

Optionally, the at least two touch points are two touch points. The split screen displaying unit is further configured to: determine the split-screen ratio of a window corresponding to each of the two touch points based on a distance between a screen margin and a newest touch-point position corresponding to the touch point Optionally, a window split-screen display boundary of the at least two windows displayed in the split-screen manner passes through a center of a circumcircle of touch points or passes through one of the touch points.

In this case, in the apparatus for displaying the windows in the split-screen manner according to the present disclosure, the intelligent terminal is connected to the large-screen display, and the large-screen display displays the multiple windows. The intelligent terminal receives, in real time, the touch-point position information sent by the large-screen display, where the touch-point position information is acquired by the large-screen display when the operation which drags the at least two windows is detected, and a touch point exists in the preset dragging region of each of the at least two windows. In a case that the intelligent terminal determines that the touch-point position information meets the preset position condition and receives the touch-point disappearing information sent by the large-screen display, the intelligent terminal controls the at least two windows to be displayed in the split-screen manner. It can be seen that, according to the present disclosure, displaying the windows in the split-screen manner is achieved with a touch control based on a user's will for the multiple windows displayed on the large-screen display, which increases operating convenience for the user and accuracy of split screen, thereby improving the experience of the user.

Figure 8:
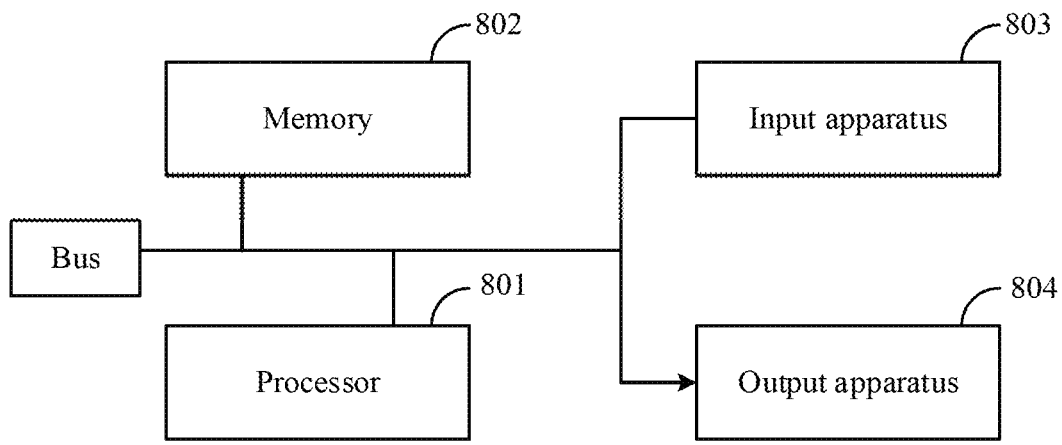
FIG. 8 is a schematic structural diagram of a device for displaying windows in a split-screen manner according to an embodiment of the present disclosure.

Correspondingly, a device for displaying windows in a split-screen manner is further provided according to an embodiment of the present disclosure. Reference is made to FIG. 8, where the device may include a processor 810, a memory 802, an input apparatus 803 and an output apparatus 804. The number of the processor 801 in the device for displaying the windows in the split-screen manner may be one or more. In FIG. 8, a case where the number of the processor 801 is one is taken as an example. In some embodiments of the present disclosure, the processor 801, the memory 802, the input means 803 and the output means 804 may be connected via a bus or in other manners. In FIG. 8, connecting via the bus is taken as an example. The memory 802 may be configured to store software programs and software modules. The processor 801 may execute various function applications and data processing of the device for displaying the windows in the split-screen manner by running the software programs and the software modules stored in the memory 802. The memory 802 may mainly include a program storing region and a data storing region. The program storing region may store, for example, an operating system and an application required by at least one function. Additionally, the memory 802 may include a high-speed random access memory, and may further include a non-volatile memory, such as at least one magnetic disk memory, a flash memory, or other volatile solid-state memories. The input means 803 may be configured to receive inputted number or character information, and generate an input signal which is related to user settings and function controls of the device for displaying the windows in the split-screen manner.

Specifically, in the embodiment, the processor 801 may load into the memory 802, according to following instructions, an executable file corresponding to a process of one or more applications. The processor 801 runs the applications stored in the memory 802, thereby achieving various functions in the method for displaying the windows in the split-screen manner.

Since the apparatus embodiments basically correspond to the method embodiments, reference may be made to the relevant part of the method embodiments. The apparatus embodiments described above are illustrative only. The units illustrated as separate components may be or may not be physically separated, and a component displayed as a unit may be or may not be a physical unit, which may be located at one place, or may be distributed on multiple network units. Based on actual needs, some or all modules may be selected to achieve the object of the solutions in the embodiments. Those skilled in the art can understand and implement without creative works.

It should be noted that in the specification, relational terms such as the first or the second are only used to differentiate one entity or operation from another entity or operation, rather than require or indicate any actual relation or sequence between the entities or operations. Moreover, terms "include", "have" or any other variants thereof are meant to cover non-exclusive inclusion, so that the process, method, item or apparatus including a series of elements is not limited to those elements, and optionally includes other elements that are not specifically listed or that are inherent in the process, method, item or apparatus. With no other limitations, an element restricted by the phrase "include a . . . " does not exclude the existence of other identical elements in the process, method, item or apparatus including the element.

The method, the apparatus, and the device for displaying the windows in the split-screen manner according to the embodiments of the present disclosure are described in detail in the above. Specific examples are applied herein to illustrate the principle and the implementations of the present disclosure. The foregoing descriptions of the embodiments are only intended to help understand the method and core idea of the invention. Meanwhile, for those skilled in the art, changes can be made to the specific implementations and application range based on the idea of the present disclosure. In conclusion, the content of the specification should not be construed as a limit to the invention.

The invention claimed is:

1. A method for displaying windows in a split-screen manner, applied to an intelligent terminal, wherein the intelligent terminal is connected to a large-screen display, the large-screen display is an external display, the large-screen display displays a plurality of windows, and the method comprises:
   receiving in real time, by the intelligent terminal, touch-point position information sent by the large-screen display, wherein the touch-point position information is acquired by the large-screen display when a user's operation which simultaneously drags at least two windows is detected, and a touch point exists in a preset dragging region of each of the at least two windows;
   determining, by the intelligent terminal, that the touch-point position information meets a preset position condition, wherein the touch-point position information comprises information indicative of at least two touch points corresponding to the at least two windows, respectively;
   wherein the at least two windows are three windows, each of the three windows corresponds to one touch point, and the determining that the touch-point position information meets the preset position condition further comprises:
      determining, by the intelligent terminal in real time, whether the three touch points are aligned in a straight line based on the touch-point position information and whether a distance associated with the three touch points satisfies at least one first preset threshold based on the touch-point position information;
   wherein the at least two windows are two windows, each of the two windows corresponds to one touch point, and the determining that the touch-point position information meets the preset position condition further comprises:
      determining, by the intelligent terminal in real time, whether a distance between the two touch points satisfies a second preset threshold based on the touch-point position information;
   receiving touch-point disappearing information sent by the large-screen display; and
   in response to a determination that the touch-point position information meets the preset position condition, controlling, by the intelligent terminal, the at least two windows to be displayed in a split-screen manner.

2. The method for displaying windows in a split-screen manner according to claim 1, wherein the controlling, by the intelligent terminal, the at least two windows to be displayed in the split screen manner further comprises:
   determining, by the intelligent terminal in real time, whether the touch-point position information meets the preset position condition;
   controlling, by the intelligent terminal, to display a preview effect of the at least two windows displayed in the split-screen manner, in a case that the intelligent terminal determines that the touch-point position information meets the preset position condition; and
   controlling, by the intelligent terminal, the at least two windows to be displayed in the split screen manner, in a case that the intelligent terminal receives the touch-point disappearing information sent by the large-screen display.

3. The method for displaying windows in a split-screen manner according to claim 1, further comprising:
   in response to a determination that the three touch points are aligned in the straight line, determining that a largest distance among the three touch points is smaller than a third preset threshold based on the touch-point position information; and
   in response to a determination that the three touch points are not aligned in a straight line, determining that a radius of a circumcircle of the three touch points is smaller than a fourth preset threshold based on the touch-point position information.

4. The method for displaying windows in a split-screen manner according to claim 1, further comprising:

determining that the distance between the two touch points is smaller than the second preset threshold based on the touch-point position information.

5. The method for displaying windows in a split-screen manner according to claim 2, wherein the controlling, by the intelligent terminal, to display the preview effect of the at least two windows displayed in the split-screen manner, in a case that the intelligent terminal determines that the touch-point position information meets the preset position condition comprises:
controlling, by the intelligent terminal, to display in a manner of a blurred full-screen window, the preview effect of the at least two windows displayed in the split-screen manner, in a case that the intelligent terminal determines that the touch-point position information meets the preset position condition.

6. The method for displaying windows in a split-screen manner according to claim 1, wherein after controlling the at least two windows to be displayed in the split-screen manner, the method further comprises:
receiving, by the intelligent terminal, position adjusting information of a split-screen display boundary from the large-screen display, wherein the position adjusting information of the split-screen display boundary is acquired by the large-screen display after detecting an operation which adjusts the split-screen display boundary; and
adjusting, by the intelligent terminal, a size of the at least two windows displayed in the split-screen manner based on the position adjusting information of the split-screen display boundary.

7. The method for displaying windows in a split-screen manner according to claim 1, wherein the controlling, by the intelligent terminal, the at least two windows to be displayed in the split-screen manner further comprises:
determining, by the intelligent terminal, a display position of the at least two windows based on newest touch-point position information, in a case that the intelligent terminal determines that the touch-point position information meets the preset position condition and receives touch-point disappearing information sent by the large-screen display, and controlling, by the intelligent terminal based on the display position, the at least two windows to be displayed in the split-screen manner.

8. The method for displaying windows in a split-screen manner according to claim 7, wherein before determining the display position of the at least two windows based on the newest touch-point information, the method further comprises:
determining, by the intelligent terminal, position movement information of a touch point of each of the at least two windows, wherein the position movement information comprises a start point and an end point of position movement of the touch point; and
determining, by the intelligent terminal, the end point indicated by the position movement information as a newest touch-point position corresponding to the touch point of the window, wherein
the determining the display position of the at least two windows based on the newest touch point position information comprises:
determining, by the intelligent terminal, the display position of the at least two windows based on the newest touch point position determined based on the position movement information corresponding to each of the at least two windows.

9. The method for displaying windows in a split-screen manner according to claim 1, wherein the controlling, by the intelligent terminal, the at least two windows to be displayed in a split-screen manner further comprises:
determining, by the intelligent terminal, a split-screen ratio of the at least two windows displayed in the split-screen manner based on newest touch-point position information, in a case that the intelligent terminal determines that the touch-point position information meets the preset position condition, and receives the touch-point disappearing information sent by the large-screen display.

10. The method for displaying windows in a split-screen manner according to claim 9, wherein the at least two touch points are two touch points, and
the determining the split-screen ratio of the at least two windows displayed in the split-screen manner based on the newest touch-point position information comprises:
determining a display ratio of a window corresponding to each of the two touch points based on a distance between a screen margin and a newest touch-point position corresponding to the touch point.

11. The method for displaying windows in a split-screen manner according to claim 9, wherein a window split-screen display boundary of the at least two windows displayed in the split-screen manner passes through a center of a circumcircle of the touch points or passes through one of the touch points.

12. An apparatus for displaying windows in a split-screen manner, applied to an intelligent terminal, wherein the intelligent terminal is connected to a large-screen display, the large-screen display is an external display, the large-screen display displays a plurality of windows, and the apparatus comprises:
at least one processor; and
at least one memory communicatively coupled to the at least one processor and storing instructions that upon execution by the at least one processor cause the apparatus to:
receive in real time, touch-point position information sent by the large-screen display, wherein the touch-point position information is acquired by the large-screen display when a user's operation which simultaneously drags at least two windows is detected, and a touch point exists in a preset dragging region of each of the at least two windows;
determine, by the intelligent terminal, that the touch-point position information meets a preset position condition, wherein the touch-point position information comprises information indicative of at least two touch points corresponding to the at least two windows, respectively;
wherein the at least two windows are three windows, each of the three windows corresponds to one touch point, and the determining that the touch-point position information meets the preset position condition further comprises:
determining, by the intelligent terminal in real time, whether the three touch points are aligned in a straight line based on the touch-point position information and whether a distance associated with the three touch points satisfies at least one first preset threshold based on the touch-point position information;
wherein the at least two windows are two windows, each of the two windows corresponds to one touch point, and the determining that the touch-point position information meets the preset position condition further comprises:
  determining, by the intelligent terminal in real time, whether a distance between the two touch points satisfies a second preset threshold based on the touch-point position information;
receive touch-point disappearing information sent by the large-screen display; and
control the at least two windows to be displayed in a split-screen manner in response to a determination that the touch-point position information meets the preset position condition.

13. The apparatus for displaying windows in a split-screen manner according to claim 12, the at least one memory further storing instructions that upon execution by the at least one processor cause the apparatus to:
  determine, in real time, whether the touch-point position information meets the preset position condition;
  control to display a preview effect of the at least two windows displayed in the split-screen manner, in a case that the touch-point position information is determined to meet the preset position condition; and
  control the at least two windows to be displayed in the split-screen manner, in a case that the touch-point disappearing information sent by the large-screen display is received.

14. The apparatus for displaying windows in a split-screen manner according to claim 12, the at least one memory further storing instructions that upon execution by the at least one processor cause the apparatus to:
  in response to a determination that the three touch points are aligned in the straight line, determine that a largest distance among the three touch points is smaller than a third preset threshold based on the touch-point position information; and
  in response to a determination that the three touch points are not aligned in the straight line, determine that a radius of a circumcircle of the three touch points is smaller than a fourth preset threshold based on the touch-point position information.

15. The apparatus for displaying windows in a split-screen manner according to claim 12, the at least one memory further storing instructions that upon execution by the at least one processor cause the apparatus to:
  determine, in real time, that the distance between the two touch points is smaller than the second preset based on the touch-point position information.

16. The apparatus for displaying windows in a split-screen manner according to claim 13, the at least one memory further storing instructions that upon execution by the at least one processor cause the apparatus to:
  control to display in a manner of a blurred full-screen window, the preview effect of the at least two windows displayed in the split-screen manner, in a case that the touch-point position information is determined to meet the preset position condition.

17. The apparatus for displaying windows in a split-screen manner according to claim 12, the at least one memory further storing instructions that upon execution by the at least one processor cause the apparatus to:
  receive position adjusting information of a split-screen display boundary from the large-screen display, wherein the position adjusting information of the split-screen display boundary is acquired by the large-screen display after detecting an operation which adjusts the split-screen display boundary; and
  adjust a size of the at least two windows displayed in the split-screen manner based on the position adjusting information of the split-screen display boundary.

18. The apparatus for displaying windows in a split-screen manner according to claim 12, the at least one memory further storing instructions that upon execution by the at least one processor cause the apparatus to:
  determine a display position of the at least two windows based on newest touch-point position information, in a case that the touch-point position information is determined to meet the preset position condition and touch-point disappearing information sent by the large-screen display is received, and control, based on the display position, the at least two windows to be displayed in the split-screen manner.

19. The apparatus for displaying windows in a split-screen manner according to claim 18, wherein before the display position of the at least two windows is determined based on the newest touch-point position information, the at least one memory further storing instructions that upon execution by the at least one processor cause the apparatus to:
  determine position movement information of a touch point of each of the at least two windows, wherein the position movement information comprises a start point and an end point of position movement of the touch point;
  determine the end point indicated by the position movement information as a newest touch-point position corresponding to the touch point of the windows; and
  determine the display position of the at least two windows based on the newest touch-point position determined based on the position movement information corresponding to each of the at least two windows.

20. A non-transitory computer-readable medium bearing computer-readable instructions that upon execution on a computing device cause the computing device at least to:
  receive in real time touch-point position information sent by a large-screen display that is an external display, wherein the touch-point position information is acquired by the large-screen display when a user's operation which simultaneously drags at least two windows is detected, and a touch point exists in a preset dragging region of each of the at least two windows;
  determine, by the intelligent terminal, that the touch-point position information meets a preset position condition, wherein the touch-point position information comprises information indicative of at least two touch points corresponding to the at least two windows, respectively;
  wherein the at least two windows are three windows, each of the three windows corresponds to one touch point, and the determining that the touch-point position information meets the preset position condition further comprises:
    determining, by the intelligent terminal in real time, whether the three touch points are aligned in a straight line based on the touch-point position information and whether a distance associated with the three touch points satisfies at least one first preset threshold based on the touch-point position information;
  wherein the at least two windows are two windows, each of the two windows corresponds to one touch point, and the determining that the touch-point position information meets the preset position condition further comprises:

determining, by the intelligent terminal in real time, whether a distance between the two touch points satisfies a second preset threshold based on the touch-point position information;
receive touch-point disappearing information sent by the large-screen display; and
control the at least two windows to be displayed in a split-screen manner in response to a determination that the touch-point position information meets the preset position condition.

* * * * *